Feb. 8, 1966    R. N. LEVAKE    3,233,581
INTEGRATED APPARATUS FOR MIXING AND CENTRIFUGALLY
APPLYING PLASTIC MIXTURES
Filed Jan. 30, 1963    2 Sheets-Sheet 1

RICHARD N. LEVAKE
INVENTOR

Huebner & Worrel
ATTORNEYS

United States Patent Office 3,233,581
Patented Feb. 8, 1966

3,233,581
INTEGRATED APPARATUS FOR MIXING AND CENTRIFUGALLY APPLYING PLASTIC MIXTURES
Richard N. Levake, Phoenix, Ariz., assignor to Plastic Materials, Inc., a corporation of California
Filed Jan. 30, 1963, Ser. No. 254,938
6 Claims. (Cl. 118—317)

This invention relates to apparatus adapted to coat the interior surface of hollow cylindrical articles, such as pipe and the like, with a coating of material in a plastic state. It particularly relates to integrated apparatus adapted to mix a plurality of substances supplied thereto in discrete proportions and to apply the resulting mixture on the interior surface of a pipe, wherein means are provided to effect relative movement between the apparatus and the pipe axially thereof while insuring synchronization of the rate of such relative movement with the rate of application of the mixture.

Apparatus intended for use in lining the interior surface of hollow cylindrical articles, such as pipe sections, tubing, and the like, has been designed and fabricated in a variety of forms. A characteristic almost universally common to each of these various forms of apparatus is their inability to mix a plurality of substances supplied in discrete proportions immediately before applying the resulting mixture to the inner surface of the pipe. This precludes satisfactory cyclic operations, particularly when fast curing resins are used as a coating substance. A further shortcoming is the necessity of manual operation of such apparatus to insure a substantially uniform coating as relative movement is effected between the apparatus and the cylindrical article, axially thereof.

In addition, previously known mixing apparatus does not permit a flexibility of operations wherein the proportions of constituent substances can be readily varied to meet different specifications. Also, such apparatus has been incapable of mixing bulk filler materials with a matrix material so as to decrease the volumetric requirements of the matrix substance. In the case of synthetic resins, such as various polyester and epoxy resins, the savings in raw material cost is substantial by utilizing a low-density, inexpensive bulk filler material.

Accordingly, it is an object of the present invention to provide apparatus capable of coating the interior of a hollow article with a plastic mixture of constituent substances.

Another object of the invention is to provide apparatus which effectively intermixes a plurality of substances immediately prior to applying the resulting mixture to the interior of a hollow article.

Another object is to provide in such an apparatus a material supply and dispensing means which is adapted for selectively variable proportional dispensing rates.

Another object is to provide mixing apparatus capable of utilizing a variety of matrix materials and respective compatible activating agents to produce a substantially homogeneous plastic mixture and to apply the same by centrifugal force.

Another object is to provide such mixing apparatus adapted to include in the plastic mixture a bulk filler material supplied in discrete proportions.

Another object is to provide in such mixing apparatus means to insure accurate and dependable metering of the constituent materials and means to supply the same in discrete proportions.

A further object is to provide apparatus for lining the inner surface of a pipe with a plastic mixture wherein the apparatus is semi-automatic in operation and does not require close monitoring by operating personnel.

A still further object is to provide pipe lining apparatus capable of supplying a matrix substance, an activating agent therefor and a bulk filler material in discrete proportions to a centrifugally actuated mixing and applying nozzle and to apply the resulting mixture axially along the interior surface at a rate synchronized with the supply rate of the constituent substances.

These, together with other objects, will become more fully apparent upon reference to the following description and accompanying drawings.

Figure 1:
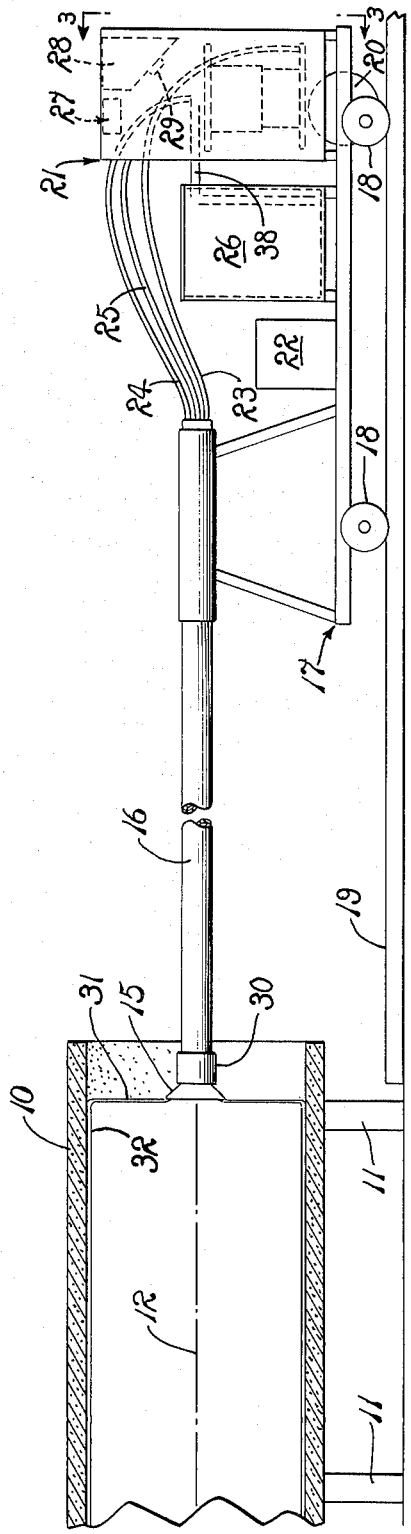
FIG. 1 is a view in side elevation, somewhat schematic and not necessarily of uniform scale for illustrative convenience, showing apparatus embodying the principles of the present invention in use to apply a lining to the interior surface of a pipe shown fragmentarily in axial section.

Referring more particularly to FIG. 1, a pipe or other hollow cylindrical article is shown fragmentarily at 10 as being supported on a stand 11 with the longitudinal axis 12 of the pipe predeterminately oriented. A material mixing and applying nozzle 15 is carried at the distal end of an axially extended boom 16 supported on a mobile carriage, generally indicated at 17. The carriage is supported on longitudinally spaced pairs of wheels 18 mounted on a trackway 19 parallel with the axis 12. A pressure fluid actuated motor schematically indicated at 20 is mounted on the carriage in driving relationship to one of the pairs of wheels. In a commercial embodiment of the invention, the motor 20 is operated by hydraulic fluid and is reversible to effect reciprocal movement of the nozzle 15 along a path of travel substantially aligned with the longitudinal axis 12 of the pipe 10.

A material supply and dispensing system is generally indicated at 21 and is mounted on the carriage 17 to provide a ready source of materials for the nozzle 15. A pressure fluid system and controls therefor are schematically indicated at 22, the details of which will be described subsequently in connection with the dispensing apparatus, the motor 20 and the interlock therebetween. A plurality of separate conduits 23, 24 and 25 lead from the supply and dispensing system 21 to the nozzle 15. Also mounted on the carriage are separate supply reservoirs 26, 27 and 28 provided respectively for a matrix material, and activating agent therefor, and a dry bulk filler material. A mechanical vibrator is schematically indicated at 29 to insure proper delivery of the dry material from the reservoir 28, which is in the form of a tapered hopper.

In commercial operation, the matrix material employed has been a polyester resin, while the activating agent has been a suitable peroxide accelerator for such a resin. Both of these substances are commercially available and may be intermixed in a great variety of proportions to form a thermosetting plastic material; the proportions, depending upon the curing time desired, can readily be determined by those skilled in the art. Satisfactory coating of the inner surface of pipe has been achieved by utilizing a mixture of polyester resin and peroxide accelerator in relative proportions as small as three hundred parts by volume of resin to one part of peroxide accelerator. In the event that the curing rate is to be increased, the proportion of peroxide accelerator is increased. In addition, the matrix material may be in the form of such a polyester resin intimately mixed with particles of silica, the proportions being as great as one part of resin to one part of silica by volume. The examples of dry bulk filler material which have been employed commercially are cottonseed hulls and like cellulose material of low density and high bulk. Glass fibers, asbestos fibers and other particles of low density inorganic substances can also be employed satisfactorily. Other suitable materials will readily occur to persons skilled in the art of compounding such mixtures.

Another example of a thermosetting plastic material which can be mixed by the nozzle 15 is a Portland cement mortar. Mortar is mixed from a matrix substance composed of sand and Portland cement in suitable proportions, as rich as equal parts by weight. The activating agent is water in a suitable proportion to result in a wet plastic cement mortar upon mixing with the sand and Portland cement matrix substance. Alternatively, the Portland cement can be supplied as the matrix substance while the sand is supplied through the reservoir 28 provided for the dry bulk filler material. The details of a satisfactory mixing and applying nozzle are described and shown in detail in my copending application Serial No. 235,345, filed November 5, 1962, entitled "Material Mixing and Applying Apparatus."

A motor schematically indicated at 30 is carried at the distal end of the boom 16 and adapted to rotate the nozzle 15 about an axis coincident with the longitudinal axis 12. Accordingly, when a matrix material, activating agent and optionally, a bulk filler material is supplied through the conduits 23, 24, and 25, the nozzle is effective to mix and to apply the resulting mixture under the influence of centrifugal force. Such a mixture being discharged from the nozzle is indicated at 31 to form a uniform coating, indicated at 32, upon relative axial movement between the nozzle 15 and the pipe 10.

Figure 3:
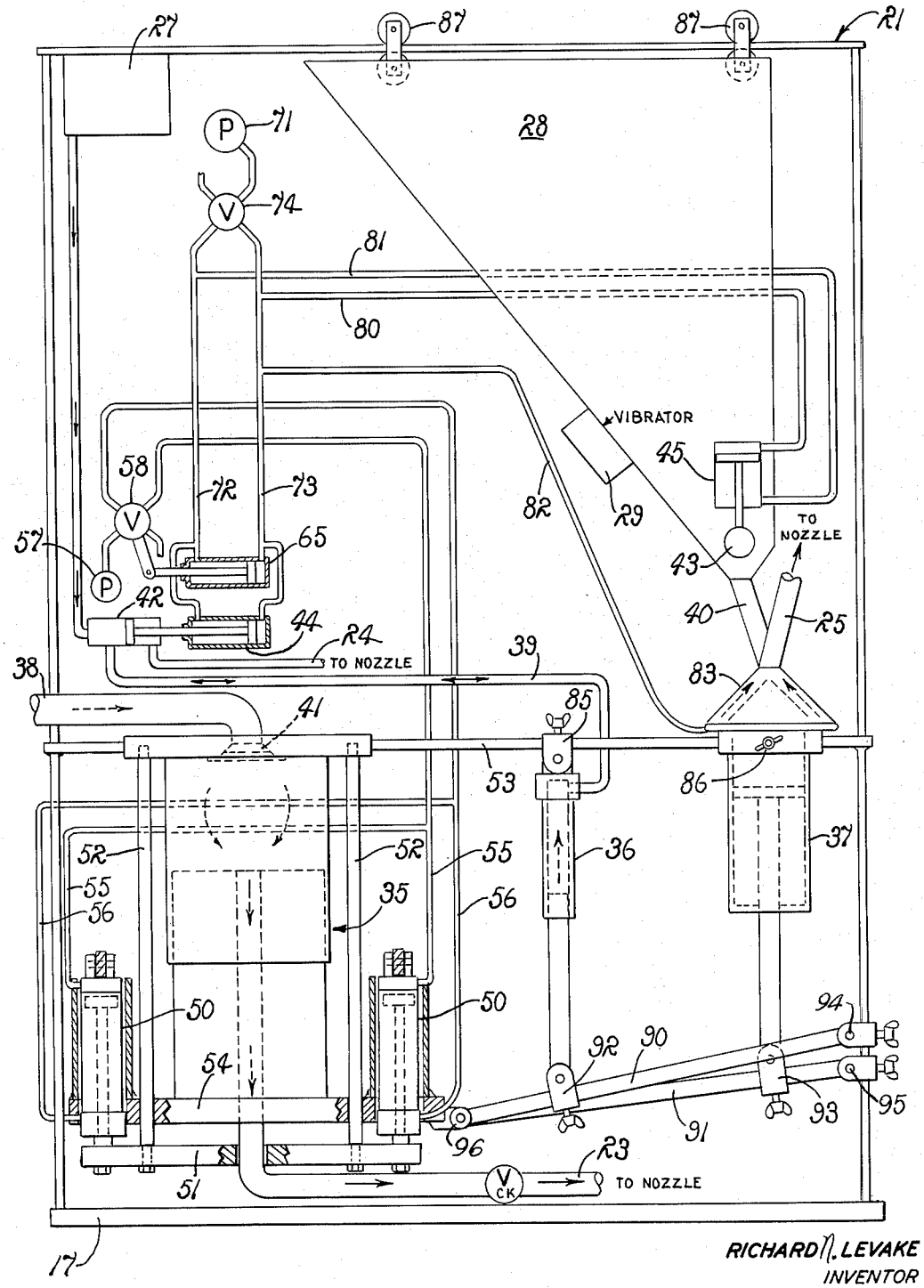
FIG. 3 is an enlarged view taken from a position indicated by the line 3—3 in FIG. 1, showing the material dispensing components employed, portions being shown schematically.

Referring in greater detail to FIG. 3, separate dispensing pumps, indicated at 35, 36 and 37, are provided respectively for a matrix material, an activating agent and a bulk filler material. Separate supply conduits 38, 39, and 40 interconnect the dispensing pumps 35, 36, and 37 with their respective reservoirs 26, 27, and 28. Each of the supply conduits is provided with respective flow control valves 41, 42, and 43, the valve 41 being in the form of a unidirectional check valve. A satisfactory check valve employed in a commercial embodiment of the present invention is described in detail in my copending application entitled "Fluid Powered, Air Eliminating Dispenser of Liquids," filed January 30, 1963, Serial No. 254,980, now Patent No. 3,207,383. The valves 42 and 43 are provided with respective servo controls in the form of pressure fluid actuated rams 44 and 45.

A plurality of pressure fluid actuated rams 50 are circumferentially spaced about the matrix dispensing pump 35 to insure uniform reciprocal operation thereof. The piston rod of each of the rams is rigidly secured to a base plate 51 supported on the carriage frame 17 by means of rods 52 rigidly secured to a transverse beam 53. The beam is connected to the carriage frame 17 as by welding. The cylinder portion of each of the rams 50 is rigidly connected to a synchronizing plate 54 to effect reciprocation of the piston of dispensing pump 35 upon actuation of the individual rams 50. The details of satisfactory rams and the connection between the synchronizing plate 54 and the dispensing pump 35 are also shown in my copending application entitled Fluid Powered, Air Eliminating Dispenser of Liquids, identified above. It is to be noted that each of the conduits 23, 24, and 25 leading to the nozzle 15 is individually connected to a respective one of the dispensing pumps 35, 36, and 37. Suitable mechanism to effect coordinated operation thereof will subsequently be described. Accordingly, the matrix material, the activating agent and the bulk filler material is supplied in discrete proportions to the nozzle through their respective conduits.

Pressure fluid conduits 55 and 56 are operatively associated with each of the rams 50 and alternately serve as supply and return lines for pressure fluid leading from a pump 57 as a source of pressure fluid from which flow is selectively controlled by a control valve 58.

Figure 2:
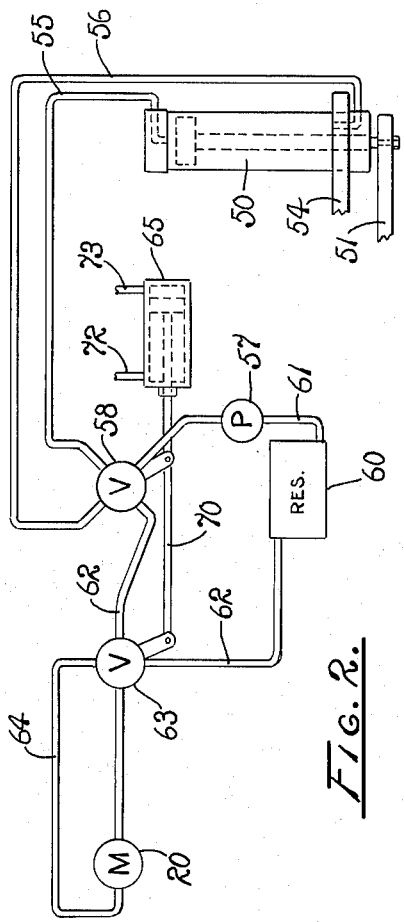
FIG. 2 is a schematic view of the fluid interlock employed in the apparatus of FIG. 1 and connected between the material dispensing means and the apparatus motivating means.

The details of the pressure fluid system are shown schematically in FIG. 2 wherein the source of pressure fluid includes a reservoir 60 as a sump connected in fluid communication with the pump 57 by conduit 61. A flow return line 62 leads from the control valve 58 to the reservoir 60. A second control valve 63 is in fluid communication with the return line 62 and a branch circuit 64 adapted to direct pressure fluid through the hydraulic motor 20 before being routed to the reservoir 60. A servo control for the valves 58 and 63 is provided in the form of a pressure fluid actuated ram 65. The ram 65 and the valves 58 and 63 are interconnected by an elongated piston rod 70. As shown in FIG. 3, a pump 71 is illustrated as a source of pressure fluid for the servo control rams. A pair of conduits 72 and 73 interconnect the servo control rams 44 and 65 in parallel and are selectively placed in communication with the pump 71 by means of a control valve 74.

In like manner, a pair of conduits 80 and 81 in parallel with the conduits 72 and 73 serve as alternate supply and return lines for the pressure fluid leading to the servo control ram 45 connected with the filler material control valve 43. A branch conduit 82 is in parallel with the conduits 80 and 73. In a commercial embodiment of the apparatus, the pressure fluid employed in the servo control circuit is compressed air. Consequently, the air flowing through conduit 82 is admitted through a conical housing 83 associated with the filler dispensing pump 37. Air flowing through the housing is ultimately discharged through the conduit 25 and thereby serves as a pneumatic conveying medium for the small particles of low density bulk filler material supplied from reservoir 28 and dispensed by pump 37.

The activating agent dispensing pump 36 is adjustably mounted on the transverse beam 53 by means of an anchorage, indicated at 85. In like manner, the dispensing pump 37 is adjustably mounted on the beam 53 by an anchorage, indicated at 86. The reservoir hopper 28 is mounted for movement on the carriage frame by means of longitudinally spaced trolley wheels 87 to facilitate adjusting movement of pump 37. The respective lower ends of the dispensing pumps 36 and 37 are adjustably anchored to a respective one of a pair of proportional feed arms 90 and 91 by means of respective adjustable connections, indicated at 92 and 93. The arms 90 and 91 are provided with respective pivotal anchorages on the carriage frame 17, indicated at 94 and 95 and are pivotally connected at their opposite ends to the synchronizing plate 54 by pins 96. It will be noted that each of the proportional feed arms is operatively connected at one end to the power rams 50 through the plate 54 and pivotally connected to the carriage frame. Accordingly, synchronized operation at predetermined proportions is afforded for the dispensing pumps 35, 36, and 37.

*Operation*

The operation of the described embodiment of the subject invention is believed to be readily apparent and is briefly summarized at this point. The supply reservoirs 26, 27, and 28 are first filled to a desired level respectively with a matrix substance, such as a polyester resin, an activating agent, such as a peroxide accelerator, and a bulk filler material, such as cotton-seed hulls. The control valve 74 is then positioned to cause movement of the respective pistons of the servo control rams 44, 45 and 65 to their respective positions shown in FIG. 3. Contemporaneously, hydraulic fluid is directed from the pump 57 through the control valve 58 to the rams 50 to effect downward movement of the synchronizing plate 54. Consequently, the supply of matrix material is drawn into the dispensing pump 35 through the conduit 38. Concurrently, through the action of the proportional feed arms 90 and 91, the respective pistons of the dispensing pumps 36 and 37 are moved downwardly as viewed in FIG. 3.

Upon reaching the limit of the downward stroke of the rams 50, the control valve 74 is manually positioned to admit pressure fluid to the conduits 80 and 73, thereby actuating rams 44 and 45 and moving the valves 42 and 43 to a position blocking flow between the reservoirs 27 and 28 and their respective dispensing pumps 36 and 37. The valve 42 is also arranged, upon proper positioning under the influence of ram 44, to establish communication between the dispensing pump 36 and the conduit 24 leading to the nozzle 15. Since the servo control rams 44 and 65 are arranged in parallel relationship under the influence of valve 74, the control valve 58 is shifted to a position to admit pressure fluid from the pump 57 to the hydraulic rams 50 to effect upward movement of the synchronizing plate 54. Consequently, matrix material is dispensed from pump 35 through the conduit 23 to the nozzle 15. At the same time, the motor 30 is energized by any suitable means, not shown, to effect rotation of the nozzle 15 about an axis coincident with the axis 12. The respective positions of the dispensing pumps 36 and 37 are predeterminately adjusted on their respective proportional feed arms 90 and 91 to effect simultaneous delivery of the activating agent through conduit 24 and the bulk filler material through conduit 25 leading to the nozzle 15. Accordingly, the matrix material, activating agent therefor, and bulk filler material are supplied in discrete, predetermined proportions to the nozzle 15 wherein they are intimately mixed and the resulting mixture is discharged under the influence of centrifugal force to be applied to the interior surface of the pipe 10. By changing the positions of the dispensing pump 36 and 37 relative to their respective proportional feed arm 90 and 91, a variety of selective proportions between the constituent substances can be achieved.

It should be noted that movement of the valve 58 is interlocked with movement of the valve 63 so that pressure fluid being returned from the rams 50 is routed through the branch circuit 64 to drive the hydraulic motor 20 and thence return to the reservoir sump 60. Accordingly, the rate of movement of the carriage and the nozzle 15 relative to the pipe 10 is proportional to the rate of material dispensed by the pumps 35, 36, and 37 and subsequently supplied to and discharged by the nozzle 15. Consequently, the thickness of the coating 32 can be automatically controlled without close surveillance by operating personnel. Moreover, operation of the hydraulic motor 20 and operation of the pumps 36 and 37 are simultaneously initiated and simultaneously terminated.

The present invention provides an integrated, highly versatile apparatus adapted to mix a plurality of substances to form a plastic mixture and to apply the resulting mixture to the interior surface of a hollow cylindrical article. The apparatus includes an interlocking mechanism to insure synchronized relative axial movement between the article and the nozzle 15 thereby to apply a uniform coating automatically. Variations of the thickness and types of coatings will readily occur to those familiar with the art, such variations including the formation of tubular pipes and the like by selective control of the constituent substances and the coating thickness.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In apparatus for lining a hollow cylindrical object having the longitudinal axis thereof predeterminately oriented, material applying means adapted to mix a plurality of substances delivered thereto in descrete porportions and to discharge the resulting mixture under the influence of centrifugal force; powered means for rotating said applying means about an axis coincident with said longitudinal axis; means to deliver a plurality of substances in discrete proportions to said applying means; a carriage supporting said material applying means and adapted for movement along a path of travel aligned with said longitudinal axis; motor means for moving said carriage; and means including interlock means for simultaneously initiating and simultaneously terminating opeartion of the said delivery means and said motor means.

2. A machine for applying a protective coating to the inner surface of a pipe section and the like and comprising means to support the pipe with the longitudinal axis thereof predeterminately oriented; mixing and applying nozzle means adapted to mix a matrix substance and an activating agent therefor and to discharge the resulting mixture under the influence of centrifugal force; powered means to rotate said nozzle means about an axis coincident with said longitudinal axis; separate supply means for said matrix substance and said activating agent including powered pumping means to deliver said matrix and agent to said nozzle means at selective predetermined proportions; a mobile carriage supporting said nozzle thereon for movement along a path of travel substantially aligned with said longitudinal axis; motor means for moving said carriage; and means including interlock means for simultaneously initiating and simultaneously terminating operation of the said delivery means and said motor means.

3. In apparatus for lining a hollow cylindrical object having the longitudinal axis thereof predeterminately oriented, a mixing and applying nozzle means adapted to mix a matrix substance and an activating agent therefor and to discharge the resulting mixture under the influence of centrifugal force; powered means to rotate said nozzle means about an axis coincident with said longitudinal axis; supply means for a plurality of substances, including pressure fluid actuated pump means to deliver to said nozzle means discrete proportions of said substances, a mobile carriage supporting said nozzle means for movement along a path of travel substantially aligned with said longitudinal axis; pressure fluid actuated motor means for said carriage, a source of fluid pressure including a sump; conduit means interconnecting the source, the pump means and the motor means to provide pressure fluid flow and return paths between the source and the pump means; and valve means provided in the conduit means to effect selective flow of the pressure fluid to the pump means from the source and to effect return flow from the pump means sequentially through the motor means and ultimately to the sump, whereby the pump means and the motor means begin and end operation simultaneously.

4. In apparatus for lining a hollow cylindrical object having the longitudinal axis thereof predeterminately oriented, a mixing and applying nozzle means adapted to mix a matrix substance and an activating agent therefor and to discharge the resulting mixture under the influence of centrifugal force; a mobile carriage supporting the nozzle means thereon; pressure fluid actuated motor means for the carriage to effect movement along a path of travel substantially aligned with said longitudinal axis; separate supply means for a plurality of discrete substances; separate dispensing pumps, each being associated with a respective one of said separate supply means; a pressure fluid actuated force means; a pressure fluid circuit including control valves to effect selective actuation of said force means including a fluid interlock between said force means and said motor means; and means mechanically linking said force means with each of said pumps to effect proportioned delivery therefrom upon actuation of said force means, whereby the force means and the motor means begin and end operation simultaneously.

5. In apparatus for lining a hollow cylindrical object having the longitudinal axis thereof predeterminately oriented, a mixing and applying nozzle means adapted to mix a matrix substance, an activating agent therefor and a bulk filler material and to discharge the resulting mixture under the influence of centrifugal force; separate supply means for a matrix substance, an activating agent therefor, and a bulk filler material; separate individual dispensing pumps each associated with a respective one of said separate supply means; a pressure fluid actuated force means; a pressure fluid circuit including control valves to effect selective actuation of said force means; means connecting said force means to one of said dispensing pumps; a pair of proportioning feed arms pivotally connected at one end to said force means; means providing a pivotal anchorage for the respective other ends of said feed arms; and means adjustable linking each of said arms to a respective one of the other of said dispensing pumps; a mobile carriage supporting the nozzle means thereon; a hydraulic motor mounted on said carriage to effect movement of the nozzle means along a path of travel substantially aligned with said longitudinal axis; and said pressure fluid circuit includes conduits for directing to said hydraulic motor pressure fluid returned from said force means during actuation thereof to effect operation of said hydraulic motor at a rate synchronized with said force means.

6. In apparatus for lining a hollow cylindrical article having the longitudinal axis thereof predeterminately oriented, a mixing and applying nozzle adapted to effect an intimate mixing of discrete proportions of a bulk filler material, a matrix substance and an activating agent therefor and to discharge the resulting mixture under the influence of centrifugal force; separate supply means for a matrix substance, an activating agent therefor and a bulk filler material; a plurality of separate dispensing pumps, each being operatively connected with a respective one of said supply means; a pneumatic conveying means to receive bulk filler material discharged from a respective one of said dispensing pumps and adapted to transport said material to said nozzle; conduits respectively connected between the other of said pumps and said nozzle to transport thereto said matrix material and said activating agent in discrete proportions; a source of pressure fluid including a sump; a fluid actuated ram; conduit means interconnecting said ram and said source, including control valve means adapted to supply and return pressure fluid to and from the ram to the source; means interconnecting one of said dispensing pumps with said ram; a pair of proportional feed arms individually pivotally connected at one of their respective ends with said ram; anchorage means pivotally mounting the respective opposite ends of said arms; means adjustably interconnecting each of the other of said dispensing pumps with a respective one of said arms selectively to vary the stroke of said pumps upon actuation of said ram; a mobile carriage to support said nozzle substantially coaxial with said article; an hydraulic motor mounted on said carriage in driving relationship thereto and adapted to effect movement of the carriage thereby to move the nozzle along a path of travel substantially aligned with said longitudinal axis; and a branch conduit including control valve means in fluid communication with said conduit means selectively to direct return fluid from said ram through said hydraulic motor and thence to said sump thereby to interlock the rate of movement of said carriage with the rate of matrix material dispensed.

References Cited by the Examiner

UNITED STATES PATENTS

| | | | |
|---|---|---|---|
| 2,036,810 | 4/1936 | Hurrell | 222—134 X |
| 2,099,346 | 11/1937 | Perkins | 118—306 |
| 2,652,175 | 9/1953 | Davis | 222—504 X |
| 2,688,423 | 9/1954 | Davis | 222—504 X |
| 2,792,807 | 5/1957 | Cummings | 118—306 X |
| 2,910,042 | 10/1959 | Gallmeyer et al. | 118—306 X |
| 3,034,729 | 5/1962 | Gray et al. | 118—306 X |
| 3,106,735 | 10/1963 | Landrum et al. | 118—306 X |

DANIEL BLUM, *Primary Examiner.*

RICHARD D. NEVIUS, *Examiner.*

JOHN McINTOSH, *Assistant Examiner.*